No. 691,589. Patented Jan. 21, 1902.
M. E. BROOKE.
TIRE.
(Application filed Nov. 16, 1901.)
(No Model.)
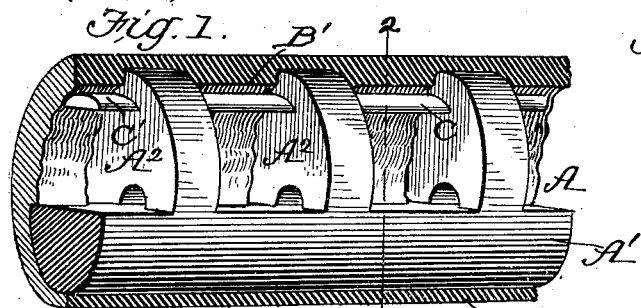
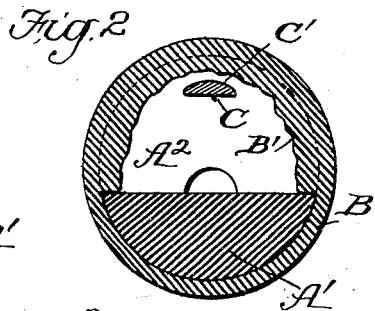
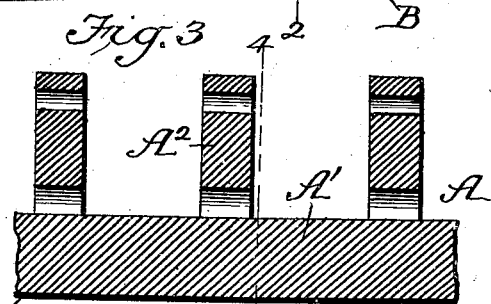
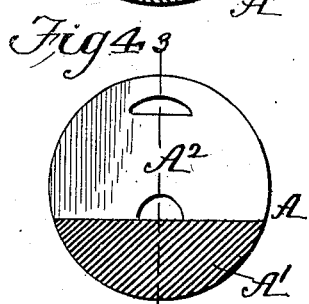
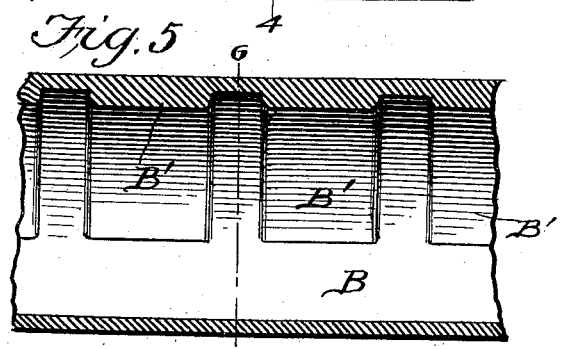
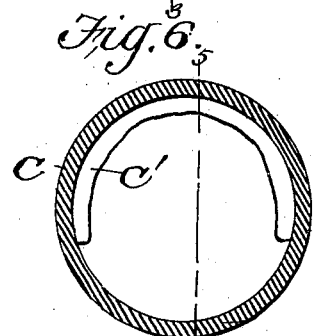
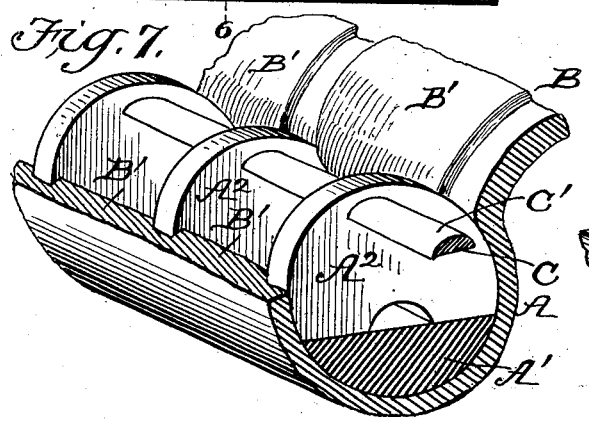
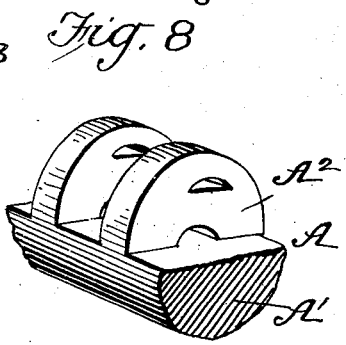
WITNESSES:
Jos. A. Ryan
Perry B. Turpin
INVENTOR
Mary E. Brooke,
BY Munn & Co
ATTORNEYS

UNITED STATES PATENT OFFICE.

MARY E. BROOKE, OF DENVER, COLORADO.

TIRE.

SPECIFICATION forming part of Letters Patent No. 691,589, dated January 21, 1902.

Application filed November 16, 1901. Serial No. 82,580. (No model.)

*To all whom it may concern:*

Be it known that I, MARY E. BROOKE, a citizen of the United States, residing at Denver, in the county of Arapahoe and State of Colorado, have made certain new and useful Improvements in Tires, of which the following is a specification.

My invention is an improvement in tires designed for use on the wheels of automobiles, bicycles, carriages, and other vehicles; and it consists in the novel constructions and combinations of parts, as will be hereinafter described and claimed.

In the drawings, Figure 1 is a sectional perspective view of a portion of a tire embodying my invention. Fig. 2 is a detail cross-section on about line 2 2 of Fig. 1. Fig. 3 is a longitudinal section of the core on about line 3 3 of Fig. 4. Fig. 4 is a cross-section of the core on about line 4 4 of Fig. 3. Fig. 5 is a longitudinal section of the casing on about line 5 5 of Fig. 6. Fig. 6 is a cross-section of the tire-casing on about line 6 6 of Fig. 5. Fig. 7 is a sectional perspective view of a portion of a tire with a part of the casing stripped from the core and turned back, and Fig. 8 is a detail perspective view of a portion of the core.

By my invention I seek to provide a tire which will be of a greater resilience with a given strength than the ordinary tire, a tire which will have a novel construction of core, a tire which will have a novel construction of casing, and a tire in which the casing when applied to the core will brace each of the disks or spaced-apart projections of the core apart and will tend to prevent any displacement of the outer edges of the said disks or projections.

In carrying out my invention I construct the tire of the core A and the casing B each of a special construction, as will be described.

The core A includes a rib or tread A', which extends throughout the length of the core, receives the tread-pressure in operation, and operates to connect the disks or projections $A^2$, as shown. In practice I form the tread-rib A' and the disks $A^2$ integral and curve the outer side of the tread A' in cross-section and also the outer edges of the disks $A^2$, so the cross-section of the core will conform throughout to the cross-section of the tire, which will be completed by the application of the casing B, as shown in the drawings.

The rib A' may preferably be formed segmental in cross-section and approaching the half of a circle, as shown; but it will be understood that the cross-sectional extent of this rib or tread may be varied, according to the size of the tire or the character of work to which it is intended to be applied, and that the cross-sectional size of the rib may increase or decrease, according to the weight to be borne by the wheels. The disks or lugs $A^2$ project inwardly from the rib A', and in operation the core may be made in straight lengths and secured around the wheel, or it may be made in circles and fitted on the wheel.

When applied to the wheel, the core may be secured by means of the rod C, which extends through the disks $A^2$ at a point diametrically opposite the rib A' and is of a special construction in cross-section, being curved on its inner side at C' concentrically with the adjacent edge of the disks and being flattened on its opposite edge, so it will provide the broadest surface for securing the disks, and yet will not be excessive in weight. The ends of this rod C when the tire is applied may be secured in any suitable manner, and it will be understood that while I may prefer to use this rod C, I do not desire to be limited thereto in the broad features of my invention.

The core, as described, presents as an article of manufacture distinctive features in that it provides a tread or rib section, which extends longitudinally at the outer side of the core, and disks or lugs, which project from the inner side of the tread, are spaced apart, and are parallel with each other when the core is straightened out and extend radially when the core is applied to a wheel, so each of the disks will bear its portion of the weight in a line with the plane of the respective disks. It will also be noticed that the outer sides or edges of the disks are curved correspondingly with the outer edge of the rib or tread, a section of the core being shown in Fig. 8 of the drawings.

It will be understood that while it is preferred to curve the core in cross-section I do not wish to be limited in the broad features of my invention thereto, as the cross-section may be varied without departing from some of the principles of my invention.

The tire is completed by the application of the casing B to the core A. In rolling or otherwise applying the tire to the said core the inner lining of the tire, which ordinarily is of rubber material and may be composed of any of the ordinary tire compounds, is caused to protrude between the separate disks or lugs and between the opposite edges of the rib in such manner as to form an inwardly-projecting bracing portion B', which will overlap the core-rib and disks and will lock the same from displacement, thus holding the core firmly against displacement either longitudinally or rotatably and preserving the disks the desired distance apart and maintaining them in position for use as desired. In Fig. 7 I show a portion of the casing stripped from the core and turned back and illustrating clearly how the projecting portions B' lie between and brace the disks or lugs. This interlocking of the casing and core is important, as it prevents any displacement of the disks or lugs and enables me to secure the greatest amount of strength and resiliency in the given size of disk, and thus enables me to produce a tire of great strength and superior cushioning qualities.

Having thus described my invention, what I claim as new, and desire to secure by Letters Patent, is—

1. The improved tire herein described consisting of the core composed of the longitudinal tread or rib and the disks or lugs projecting from the inner side of the tread or rib, said tread or rib and lugs being curved in cross-section, and the casing fitted on the said core and having its inner lining projected into the spaces between the disks or lugs and between the opposite edges of the tread or rib whereby the core will be locked from movement longitudinally or rotatably in the casing and the disks or lugs will be separately and independently braced throughout their edges by the projecting portions of the casing substantially as set forth.

2. A cushion-tire consisting of a core having transverse disks or lugs spaced apart and a casing fitting on said core and having its inner lining pressed partially into the spaces between said disks or lugs whereby the lining will overlap the edges of the lugs and will brace the same and hold them from displacement substantially as set forth.

3. A core for cushion-tires composed of the integral longitudinal tread or rib and the spaced-apart disks or lugs, the disks or lugs being projected from the inner edge of the tread and extending parallel to each other and at a right angle to the direction of tread and the outer edge of the tread and of the disks being curved correspondingly substantially as and for the purposes set forth.

4. A core for a cushion-tire composed of rubber and consisting of the longitudinal tread or rib and the spaced-apart disks or lugs projected from the inner side of the rib and lying in parallel planes and in planes at a right angle to the direction of length of the tread or rib and formed on their outer edges to conform to the bore of the tire substantially as set forth.

5. A core for a cushion-tire consisting of the longitudinal tread or rib and a series of disks integral with and projecting from the inner side of the tread or rib and provided near their edges diametrically opposite the tread or rib with openings which are curved at their sides adjacent to the edges of the disks correspondingly thereto and are flat or square at their opposite edges substantially as set forth.

6. A tire composed of a core having longitudinal tread or rib and provided on the inner side thereof with the projected disks or lugs and having said lugs provided near their edges diametrically opposite the tread with openings which are flat on the side next the rib and are rounded on the opposite side, the casing fitted upon the core and having its inner side or lining provided with projecting portions which overlap the edges of the tread and disks and prevent any lateral or longitudinal displacement of the core-tread or disks, and the tie-bar passed through the opening in the disks and being rounded on one side and flattened on its opposite side and arranged with its flattened side next to the tread or rib of the core substantially as set forth.

7. A cushion-tire consisting of a core composed of the longitudinal tread or rib and the spaced-apart lugs or disks on the inner side thereof, and the casing applied to said core and having an inner lining which projects between the disks and overlaps the opposite edges of the rib or tread substantially as set forth.

MARY E. BROOKE.

Witnesses:
PERRY B. TURPIN,
SOLON C. KEMON.